April 29, 1958 S. DE ORLOW 2,832,620
LATCH STRUCTURE FOR VEHICLE REAR DECK
Filed Jan. 28, 1955
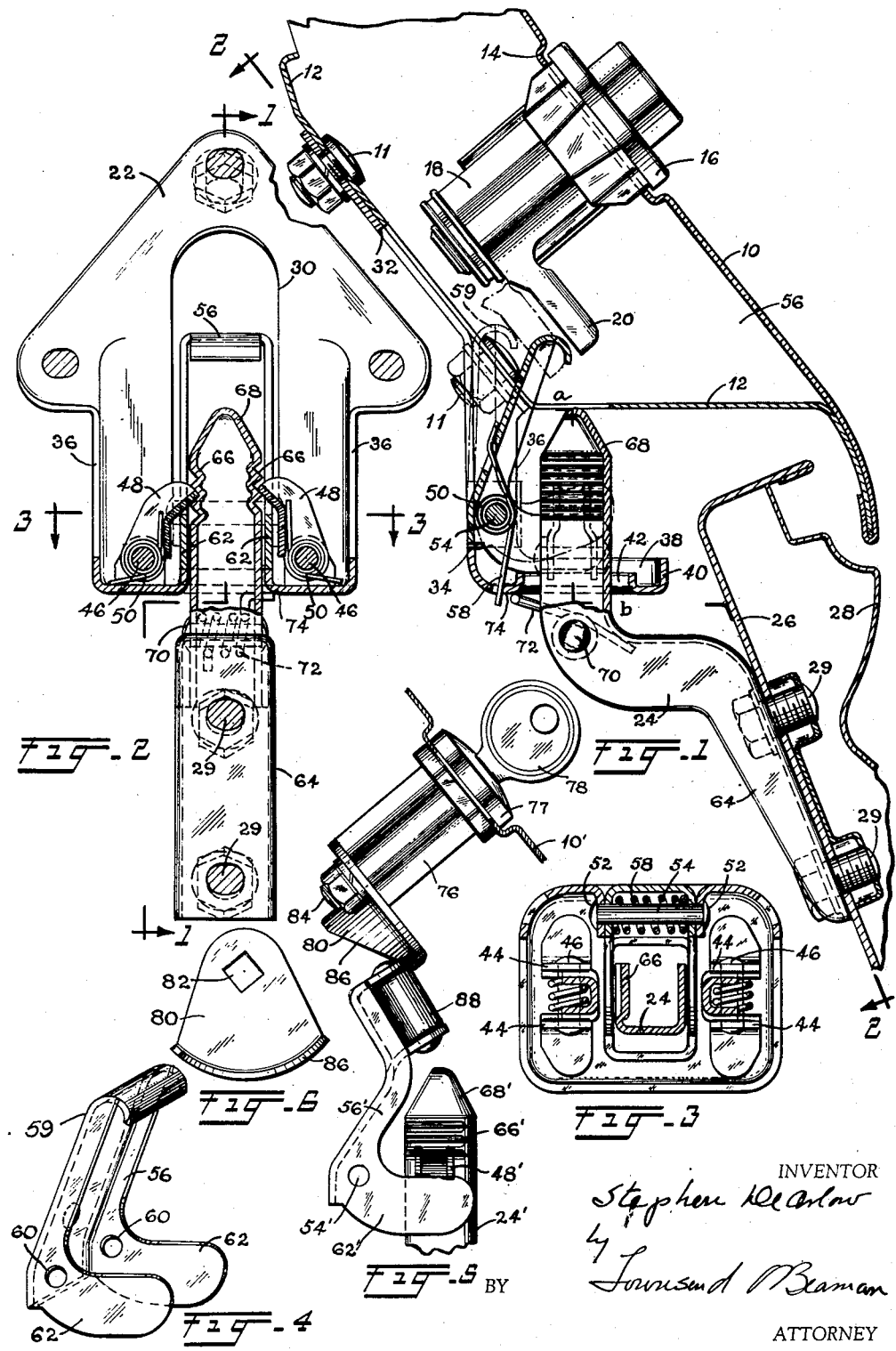
INVENTOR
Stephen DeOrlow
BY
Townsend Beaman
ATTORNEY

# United States Patent Office 2,832,620
Patented Apr. 29, 1958

2,832,620

LATCH STRUCTURE FOR VEHICLE REAR DECK

Stephen De Orlow, Jackson, Mich.

Application January 28, 1955, Serial No. 484,611

6 Claims. (Cl. 292—52)

This invention relates to latch mechanism being particularly adapted for use in the manufacture of vehicles in connection with the hinged deck lid or cover for the luggage compartment of passenger vehicles which are conventionally equipped with a lock.

In the mass production of vehicles it is important that latch mechanism for pivoted and hinged parts, such as hoods, doors, luggage deck lids, and the like, be readily aligned and adjusted at the time of assembly. Also, it is necessary that the latch mechanism be and remain capable of release with the development of force of a magnitude so as to enable such force to be exerted either through the key to the lock or through a thumb or finger depressed plunger, or similar structure.

It becomes the object of the present invention to provide an improved latch mechanism which meets the requirements of the preceding paragraph yet may be inexpensively tooled and fabricated principally from sheet metal stampings, the latch mechanism being substantially self-aligning and self-adjusting and requiring a minimum exertion of force to effect a release from the latched position.

In the drawings,

Fig. 1 is a fragmentary vertical section of the rear deck lid of the luggage compartment of a passenger vehicle showing the latch mechanism installed with the portion in section taken on line I—I of Fig. 2, Fig. 2 is a view of the latch mechanism taken along the line II—II of Fig. 1 with the portion in section being between a—b on line II—II, Fig. 3 is a sectional view of the latch mechanism taken on line III—III of Fig. 2, Fig. 4 is a perspective view of the catch release member, Fig. 5 is a diagrammatic view of a modified form of the invention, and Fig. 6 is a detail view of the cam actuator for the catch release member of Fig. 5.

The rear deck lid 10 of the luggage compartment of a passenger vehicle has a reinforcing and mounting plate 12. A hole 14 in the deck lid 10 is provided for the mounting of a depressable plunger mechanism 16 having a key release stop which will enable the barrel 18 to be selectively projected to bring the finger 20 into latch releasing engagement with any suitable latch mechanism. All such structure is well known and forms no part of the present invention.

My improved latch mechanism to be released by the finger 20 comprises a catch plate and bracket member 22 attached to the underside of the plate 12 of the deck lid 10 by bolts 11 and a keeper bolt member 24 attached to the reinforcing plate 26 attached to the fixed structure 28 of the luggage compartment by bolts 29.

The member 22 has an angular aperture 30 extending between the points 32 and 34 of Fig. 1. The lower portion of the member 22 is shaped to form an L-bracket portion having side flanges 36 and a platform portion 38 having flanged outer sides 40, a flanged central aperture 42 and bearing ears 44 lanced out and turned up to support pivot pins 46 for the catch pawls 48 continuously urged toward each other by torsion springs 50.

In forming the aperture 30, inturned ears 52 have been lanced out of the lower central portion of the member 22 to provide a support for the pivot pin 54 upon which the latch release member 56 of Fig. 4 is mounted and urged clockwise by the spring 58 as viewed in Fig. 1. The upright portion 59 of the member 56 is curved at the top to present a smooth surface to the finger 20. Projecting forwardly of the aligned holes 60 which receive the pin 54 are pawl engaging arms 62 which engage beneath the catch pawls 48 to urge the same out of engagement with the keeper bolts as hereinafter described when the finger 20 is depressed and the member 56 is moved from the full line position of Fig. 1 to the dotted line position.

The keeper bolt 24 is generally of channel section having a lower portion 64 through which the bolts 29 extend to attach the portion 64 to the plate 26. Teeth 66 are formed on opposite sides of the upper end 68 of the keeper bolt 24. Preferably, the teeth 66 are disposed in staggered relationship whereby only one of the pawls 48 at a time is in effective engagement with the teeth 66. The arrangement reduces the relative movement by one-half required to change from one latch position to another between the teeth 66 and the pawls 48 and this enables the teeth 66 to be relatively coarse. A pin 70 carries the spring 72. With the parts in the position of Figs. 1 and 2 the spring 72 bears against the member 22 at 74 with sufficient tension to lift the rear deck lid 10 to clear the keeper bolt 24 from the aperture 42 at the time the member 56 is actuated by the finger 20.

In the modification of Fig. 5, the rear deck lid 10' supports the barrel 76 of the lock 77 to be rotated by turning the key 78. A cam 80 has a square hole 82 to be received upon a squared portion of the stud 84 carried by the barrel 76. The cam 80 has a tapered flange 86 which engages the roller 88 on the latch release member 56' to rock the same about the pin 54' when the key 78 is rotated. Counterclockwise movement of the arm 62' will engage the pawls 48' to release the same from engagement with the teeth 66' of the keeper bolt 68' in the manner of the arms 62 of the form of the invention of Figs. 1 to 4, inclusive.

Having thus described my invention what I claim as new and desire to protect by Letters Patent is:

1. In a latch mechanism for relatively movable parts of the type having a keeper mounted on one part and having teeth on opposite sides thereof, a catch bracket adapted to be mounted on the other part in alignment with the keeper for latching engagement therewith, said catch bracket having a support portion providing clearance and guide structure for the keeper, pivoted catch pawls mounted upon said support portion on opposite sides of said clearance and guide structure and having means to continuously urge the same toward the keeper when the latter is received within said clearance and guide structure and engageable by said pawls to hold said bracket and keeper against relative movement in a separation direction while permitting relative movement in a take up or closed direction, and pawl release means mounted on said bracket and having arm portions straddling said clearance and guide structure engageable with said pawls between their pivots and said clearance and guide structure to move the same out of engagement with the keeper.

2. In a latch mechanism for relatively movable parts of the type having a keeper mounted on one part and having teeth on opposite sides thereof, a catch bracket adapted to be mounted on the other part in alignment with the keeper for latching engagement therewith, said catch bracket having a support portion providing clearance and guide structure for the keeper, pawl means mounted on said support portion adjacent said structure for engaging with the keeper when the latter is disposed within said structure, pawl release means carried upon said bracket and having a forked end straddling the path of the keeper and engageable with said pawl means to move the same out of latching position with the keeper, and manually actuated means engageable with said release means to move the same from its normally inoperative position into engagement with said pawl means.

3. A catch bracket as defined in claim 2 wherein said pawl means is in the form of a pair of pawls disposed upon opposite sides of the keeper bolt with the latter disposed within said clearance and guide structure.

4. A catch bracket as defined in claim 2 wherein said pawl means is in the form of a pair of pivoted pawls disposed upon opposite sides of said keeper bolt when the latter is disposed within said clearance and guide structure for latching with the teeth upon opposite sides of the keeper bolt, the forked end of said pawl release means being in the form of a pair of arms straddling the keeper bolt in its latched position to engage the outer end of said pawls adjacent their point of engagement with the teeth of the keeper bolt to urge said pawls out of latching engagement with said teeth.

5. A catch bracket as defined in claim 2 wherein both said pawl means and said pawl releasing structure are of rockable construction.

6. A catch bracket as defined in claim 2 wherein said pawl means is in the form of a pair of pivoted pawls disposed upon opposite sides of the keeper bolt when the latter is disposed in said clearance and guide structure, said pawl release means being in the form of a lever with the forked end thereof adapted to straddle the keeper bolt and engageable with said pawls, said lever being pivoted intermediate its ends with the end remote from said forked end being aligned with said structure yet out of the path of movement of said keeper bolt.

References Cited in the file of this patent

UNITED STATES PATENTS

| | | |
|---|---|---|
| 1,263,504 | Workman | Apr. 23, 1918 |
| 2,692,788 | Willis | Oct. 26, 1954 |
| 2,699,351 | Richards | Jan. 11, 1955 |
| 2,715,538 | Janonis | Aug. 16, 1955 |